G. R. MOORE.

Assignor, by mesne assignments, to J. S. PERRY and G. SARD, Jr., Trustees.

Heating-Stove.

No. 9,247. Reissued June 8, 1880.

*Witnesses:*
Henry Eichling
Geo. A. Smith.

*Inventor:*
George R. Moore.
by Saml. A. Duncan,
atty

N. PETERS, PHOTO-LITHOGRAPHER, WASHINGTON, D. C.

UNITED STATES PATENT OFFICE.

GEORGE R. MOORE, OF PHILADELPHIA, PENNSYLVANIA, ASSIGNOR, BY MESNE ASSIGNMENTS, TO JOHN S. PERRY AND GRANGE SARD, JR., TRUSTEES.

HEATING-STOVE.

SPECIFICATION forming part of Reissued Letters Patent No. 9,247, dated June 8, 1880.

Original No. 54,938, dated May 22, 1866; Reissue No. 6,732, dated November 9, 1875. Application for reissue filed April 16, 1880.

*To all whom it may concern:*

Be it known that I, GEORGE RODNEY MOORE, formerly of the city of Lyons, in the county of Clinton and State of Iowa, but now residing in the city of Philadelphia, in the State of Pennsylvania, assignor, by mesne assignments, to JOHN S. PERRY and GRANGE SARD, Jr., trustees, both of the city of Albany, in the county of Albany and State of New York, did invent a new and useful Improvement in Stoves, of which the following is a full, clear, and exact description, reference being had to the accompanying drawings, in which—

Figure 2:
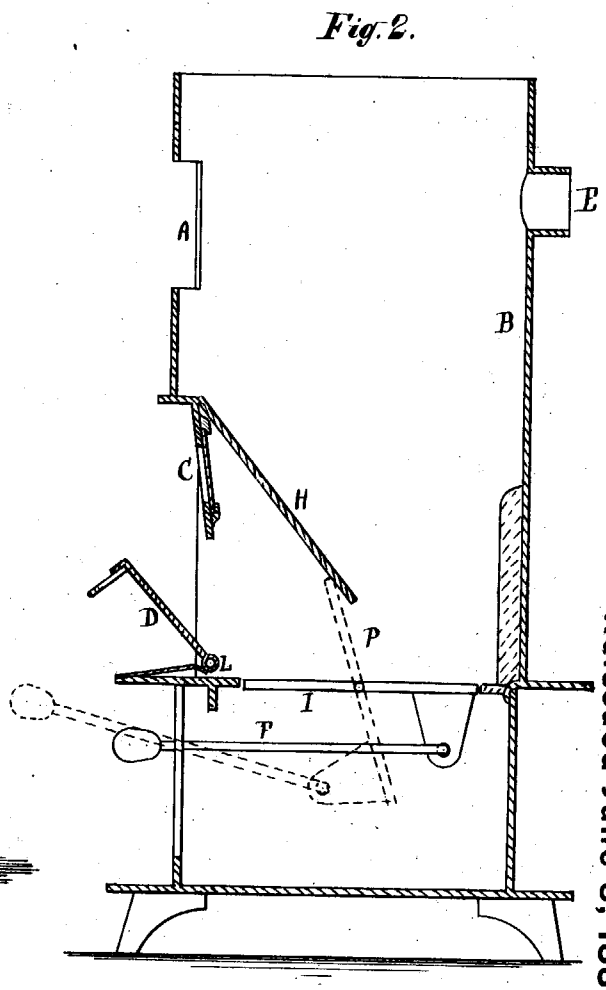
Figure 1:
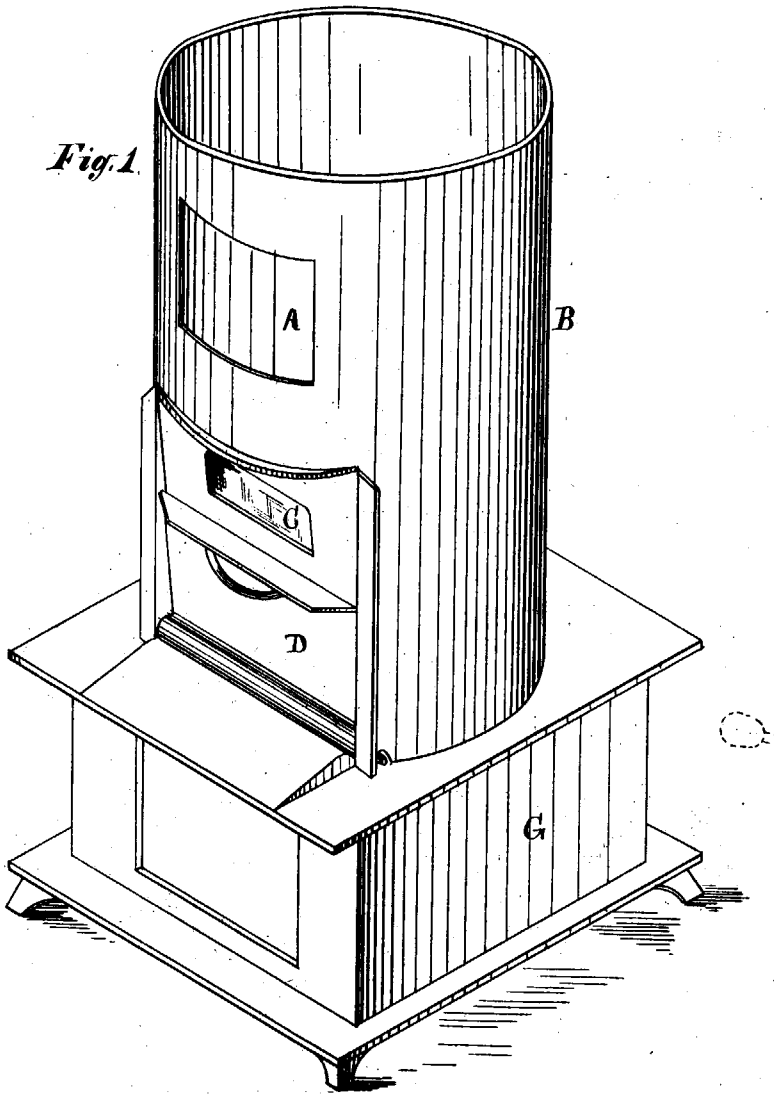

Figure 1 is a perspective view of an ordinary cylindrical heating-stove containing the improvement to which the invention relates, and Fig. 2 is a vertical central section of the same.

The invention has special reference to coal-burning stoves, the object being, primarily, to increase the facilities for managing the fire, so that it may be kept clean and perpetuated indefinitely without the necessity of discharging the contents of the fire-pot or chamber, and, secondarily, to improve the illuminating and heating capacity of the stove.

In the structure shown in the drawings, B is the cylinder or body of the stove, mounted on a hollow rectangular base, G, which serves both as an ash-pit and as a draft-chamber, through which the air passes on its way to the fire. In the lower part of the cylinder is placed the fire-pot or fuel-chamber, and below this is the grate or fire-bed I.

The fuel-chamber is contracted in a downward direction. This is effected by making a portion of its wall, H, slope inward from the shell or outer casing of the stove.

By this construction there is formed a triangular recess or space above the plane of the grate and between such inclined wall of the fire-pot and the shell of the stove. This sloping wall of the fire-pot terminates at such a point as to leave an open space, P, between it and the surface of the fire-bed or grate. In the outer casing of the stove, opposite this opening P, is a door, D, shown as turning on a horizontal hinge, L, and through this door ready access may be had to the surface of the grate and the bottom of the mass of burning fuel.

C is a mica window, also arranged in the shell of the stove and opposite the recess formed between such shell and the sloping wall of the fire-pot.

The grate is shown as mounted on pivots, and it can be dumped by means of the pull-rod F, as indicated in dotted lines. This grate is extended outwardly beyond the lower edge of the sloping wall of the fire-pot, which gives it a larger area than that of the base of the fire-pot. This enlargement of the grate-surface, in connection with the horizontal opening at the base of the fire-pot, permits a portion of the fuel to come down and spread out upon the grate without dropping into the ash-pit.

The fuel exposed through the opening P, being subjected to the direct action of the air-currents, will burn freely, and the heat thereby produced will be transmitted readily through the thin shell of the stove, and the light also will pass readily through the window C. Not only does this window serve for the purpose of illumination, but it enables the user of the stove to watch the condition of the fire.

Whenever the fire, as seen in the opening P, grows dull, it may be brightened up by stirring the burning fuel with a poker introduced through the door D. If, however, at any time the grate becomes so loaded with clinkers and spent coal or ashes as to interfere with the proper action of the stove, this refuse can be discharged into the ash-pit by tipping or dumping the grate without at the same time discharging the contents of the fire-pot proper. The form of the fire-pot permits this to be done, since the coal contained therein tends to wedge itself against the downwardly-contracted walls, and is thus held up while the grate is being cleaned.

The fuel is introduced into the fire-pot through the door A, and the products of combustion pass off through the exit-pipe E.

What is claimed as new is—

1. The combination, with the grate or fire-bed of a stove, of a downwardly-contracted fire-pot, the two being so arranged relatively to each other as to leave an opening between them, substantially as and for the purpose set forth.

2. The combination, in a stove, of a downwardly contracted fire-pot, a fire-bed or grate of larger area than the base of such fire-pot, the two being so arranged relatively to each other as to leave an opening between them, and a door and an illuminating-window arranged in the shell of the stove, below the top of the fire-pot, for giving access to and receiving light from the burning fuel on the grate, substantially as and for the purpose set forth.

3. The combination, in a stove, of a fire-pot, a fire-bed or grate, the two being so arranged relatively to each other as to leave an opening between them, and a door and an illuminating-window arranged in the shell of the stove, below the top of the fire-pot, for giving access to and receiving light from the burning fuel on the grate, substantially as and for the purpose set forth.

4. The combination, in a stove, of a downwardly-contracted fire-pot and a dumping-grate, the two being arranged relatively to each other so as to leave an opening between them, substantially as and for the purpose set forth.

GEO. RODNEY MOORE.

Witnesses:
JNO. W. FRANCIS,
H. W. FRANCIS.